(12) United States Patent
Nishii

(10) Patent No.: US 7,502,740 B2
(45) Date of Patent: Mar. 10, 2009

(54) COMMUNICATION APPARATUS

(75) Inventor: Teruyuki Nishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 927 days.

(21) Appl. No.: 10/870,391

(22) Filed: Jun. 17, 2004

(65) Prior Publication Data
US 2004/0260555 A1 Dec. 23, 2004

(30) Foreign Application Priority Data
Jun. 18, 2003 (JP) .............................. 2003-173456

(51) Int. Cl.
G10L 13/00 (2006.01)
(52) U.S. Cl. ...................... 704/260; 704/258; 709/224; 709/206
(58) Field of Classification Search ................. 704/258, 704/260, 270, 270.1; 709/206, 203, 224; 379/88.01
See application file for complete search history.

(56) References Cited

U.S. PATENT DOCUMENTS

| 6,094,681 A * | 7/2000 | Shaffer et al. ............... 709/224 |
| 6,246,983 B1 * | 6/2001 | Zou et al. .................... 704/260 |
| 6,625,257 B1 * | 9/2003 | Asaoka et al. ............ 379/88.01 |
| 7,200,636 B2 * | 4/2007 | Harding ....................... 709/206 |

* cited by examiner

Primary Examiner—Huyen X. Vo
(74) Attorney, Agent, or Firm—Canon USA Inc IP Div

(57) ABSTRACT

A communication apparatus includes a registration unit for registering setting data specifying a type of email message to be read, a synthetic-speech output unit for outputting resulting speech information, and a determining unit for determining which email message to read based on the setting data. If the user stops speech output, the user can register setting data to reject reading similar email messages and reject distribution of similar email messages by simple operations. If the user does not stop speech output, the user can register setting data to read similar email messages and to cancel rejection to distribute similar email messages by simple operations.

9 Claims, 15 Drawing Sheets

FIG. 15A

| LIST OF MAIL MESSAGES RECEIVED | |
|---|---|
| * Notice | 02/11 |
| * Information | 02/11 |
| Tomorrow's appointment | 02/10 |
| Did you watch it ? | 02/10 |
| Bargain information | 02/10 |
| Class closed | 02/09 |
| Fishing information | 02/08 |
| Fishing information | 02/08 |
| Fishing information | 02/08 |

| Return | ↑ | ↓ | Select |

FIG. 15B

Sender : Tanaka Hanako <tanaka_hanako@xyz.co.jp>
Date : 2003.02.11 10:45
Subject : Notice Today's meeting was canceled.

| Return | ← | → | Read |

COMMUNICATION APPARATUS

BACKGROUND OF THE INVENTION

1. Field of the Invention

The present invention relates to communication apparatuses, and more particularly, a communication apparatus for decoding electronic mail, converting the electronic mail into speech, and outputting the speech.

2. Description of the Related Art

Today, electronic mail or email has become an indispensable medium for daily information transmission, and are being used for various purposes and in various ways. Recently, electronic mail has been used in home communication terminals and cellular phones. This trend will continue in view of increasing uses of electronic mail by commercial services and governmental services.

The increasing usage of electronic mail, however, has caused an increase of junk mail distribution of advertisements or the like to a large number of people similar to junk phone calls. In order to receive electronic mail, in some cases it is necessary to dial up an access point of an electronic-mail distributing service. In this case, a charge arises for the reception of electronic mail. This has caused a serious concern for dealing with junk mail.

Furthermore, when compared with ordinary phones, devices having electronic mail capabilities require users to perform complex operations to select and browse a desired electronic mail or to filter out junk mail. This has inhibited active utilization of e-mail, particularly for users who wish to use e-mail but who are unfamiliar with such devices or who have disabilities such as weak eyesight. In view of such needs, attempts have been made to improve ease of operation for communication terminals used at home. For example, one device decodes and converts received electronic mail into audio information for output. This allows a user to hear email messages. In another device, as a countermeasure against junk mail, a user is able to set the device, based on sender information, keywords, or the like, to reject email from a mail distribution server or to limit output of already received email.

However, for these devices, a user must perform special operations in order to set the devices to reject distribution by a mail distribution server, to set whether a received electronic mail is to be read, to set whether a selected email is to be read, and so forth. Furthermore, the content of the setting is complex, such as a sender's mail address or a keyword. Thus, prior to a registration operation, a note must be taken of information that is needed, or an electronic mail including the sender's mail address or keywords must be printed in advance. That is, preparation for registration is laborious. In particular, in the case of apparatuses with input devices that do not have rich functions, such as home communication terminals, special and complex input operations are needed. This has been a considerable obstacle for users who are not familiar with the apparatuses. Furthermore, since the usage status of the apparatus changes in time, changes to the settings could frequently occur. For example, a new condition is added or removed for reading electronic mail. This frequently causes complex setting operations or registration operations described above, imposing considerable burden on users, such as time for changing the setting.

Furthermore, in a communication apparatus having limited memory to store setting information, information that has once been registered is maintained without being updated, even when that information becomes obsolete due to a setting change. For example, when an attempt for a new registration is rejected due to a limitation in the number of sets of registration data, information that is no longer needed must be searched for and deleted. This has imposed a considerable burden on users to confirm and delete obsolete setting information.

Furthermore, whether or not to perform audio output is determined based on a mail address of a sender, a keyword, a date, or a combination of these items. Thus, for example, in a home communication terminal, it has been difficult to control audio output at unspecific timings and under various situations, such as when the user is not at home and automatic answering is activated, when automatic answering is activated although the user is at home, and when the user is asleep and output of any operational sound is prohibited.

SUMMARY OF THE INVENTION

The present invention is directed to a communication apparatus allowing for easy setting registration. The communication apparatus includes a registration unit for registering setting data specifying a type of email message to be read by synthetic speech and a type of email message to be rejected, a determining unit for determining whether to read a received email message by synthetic speech based on the setting data, a synthetic-speech output unit for converting the received email message into synthetic speech information and outputting the synthetic speech information responsive to the determining unit determining to read the received email message, and an operating unit facilitating user input.

In one aspect of the present invention, in response to a user input to stop output of the synthetic speech information and a user input to register setting data specifying a type of email message to be rejected, the registration unit registers setting data specifying the received email message as a type of email message to be rejected. In another aspect of the present invention, in response to no user input to stop output of the synthetic speech information (i.e., the synthetic speech information of the entire received email message is outputted without stopping) and to a user input to register setting data specifying a type of email message to be read by synthetic speech, the registration unit registers setting data specifying the received email message as a type of email message to be read by synthetic speech.

In yet another aspect, in response to the user input to stop output of the synthetic speech, the apparatus confirms whether to reject distribution of email messages similar to the received email message. If the user confirms rejection of distribution, the apparatus requests a distribution server to reject distribution of email messages matching the received email message.

In yet still another aspect, in response to no user input to stop output of the synthetic speech, the apparatus confirms whether to cancel rejection of email distribution of email messages matching the received email message. If the user confirms cancellation, the apparatus requests the distribution server to cancel rejection of distribution of email messages matching the received email message.

The present invention is also directed to a method of controlling the communication apparatus.

Further features and advantages of the present invention will become apparent from the following description of the embodiments with reference to the attached drawings.

BRIEF DESCRIPTION OF THE DRAWINGS

FIGS. 15A and 15B show examples of searching for a received mail and selection of a mail by user's operations.

DESCRIPTION OF THE PREFERRED EMBODIMENTS

Figure 1:
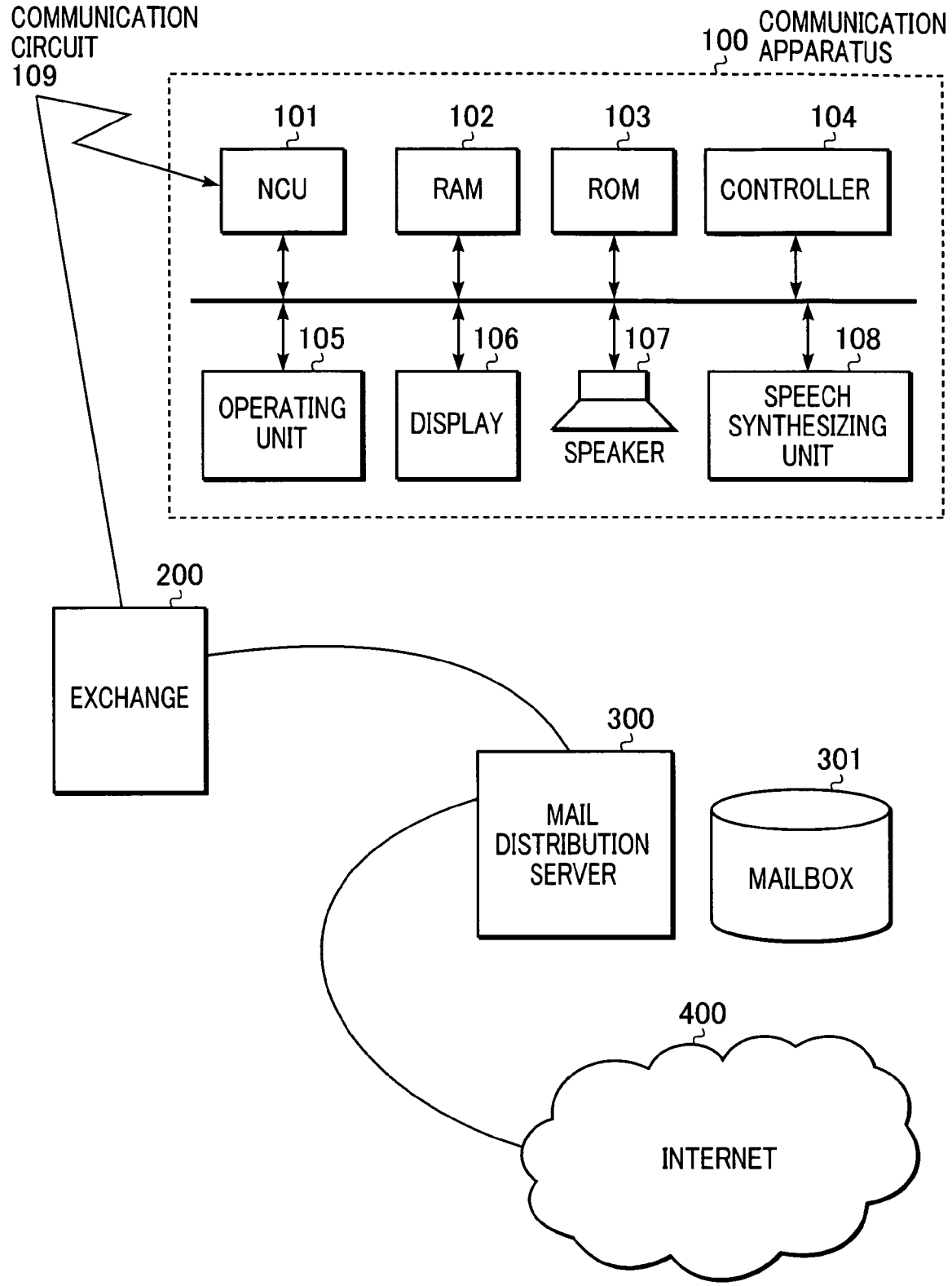
FIG. 1 is a block diagram of a facsimile apparatus according to an embodiment of the present invention.

FIG. 1 is a block diagram of a system 10 incorporating a communication apparatus 100 of the present invention.

The system 10 includes a communication circuit 109 that allows facsimile communication, phone calls, and email exchange.

The communication apparatus 100 can be a facsimile apparatus. A network control unit (NCU) 101 facilitates connection to a terminal of another party via the communication circuit 109. The facsimile apparatus 100 is connected to the communication circuit 109 via the NCU 101. The NCU 101 can electrically insulate the interior of the facsimile apparatus 100 from the communication circuit 109, acquire and release the communication circuit 109, send dial pulses and tones, monitor the communication circuit 109, and so forth, under the control of a controller 104.

A RAM 102 can store received-call history data, control data, received email messages, and synthetic-speech-output rejecting data.

A ROM 103 can store control programs for the controller 104, and initial values for various setting parameters.

The controller 104 controls each of the functional blocks shown in FIG. 1 according to the control programs stored in the ROM 104. The controller 104 can be implemented by a microprocessor, for example.

An operating/input unit 105 includes, for example, a keyboard and a pointing device. The operating unit 105, together with a display 106, constitutes a user interface. The operating unit 105 accepts, from a user, operations, such as calling, receiving calls, registration, and the like, and notifies the controller 104 of the operations performed by the operator.

The display 106 displays a variety of information, such as a dial number to be called, the status of the facsimile apparatus 100, and information for notifying a user, including an output of synthetic speech, confirmation for stopping, values of setting to be registered, guidance, and the like.

A speaker 107 is used to monitor audio signals on the communication circuit 109, call an operator, generate operational sounds and error sounds, and to output synthetic speech.

A speech synthesizing unit 108 analyzes input text information, generates synthetic speech data, and outputs synthetic speech.

An exchange 200 allows the facsimile apparatus 100 to carry out facsimile communications, to make phone calls, and to exchange e-mails.

A mail distribution server 300 is connected to the Internet 400, and it controls distribution of email. Email messages addressed to one recipient are temporarily stored in that recipient's individual mailbox 301. The email messages are distributed to individual terminals based on, for example, a standard protocol called POP3 (Post Office Protocol version 3). Furthermore, some mail distribution servers can manage sender addresses for which distribution is to be rejected. In such services, the sender addresses to be rejected are registered by users of terminals online or by a separate registration procedure. When an email message is received, the sender's address is compared against the list of addresses, and the email is rejected if a match is found. An address registered on the rejection list can be removed from the list by a user of a terminal online or by a separate registration procedure. In this embodiment, the mail distribution server 300 provides the service described above.

Figure 14:
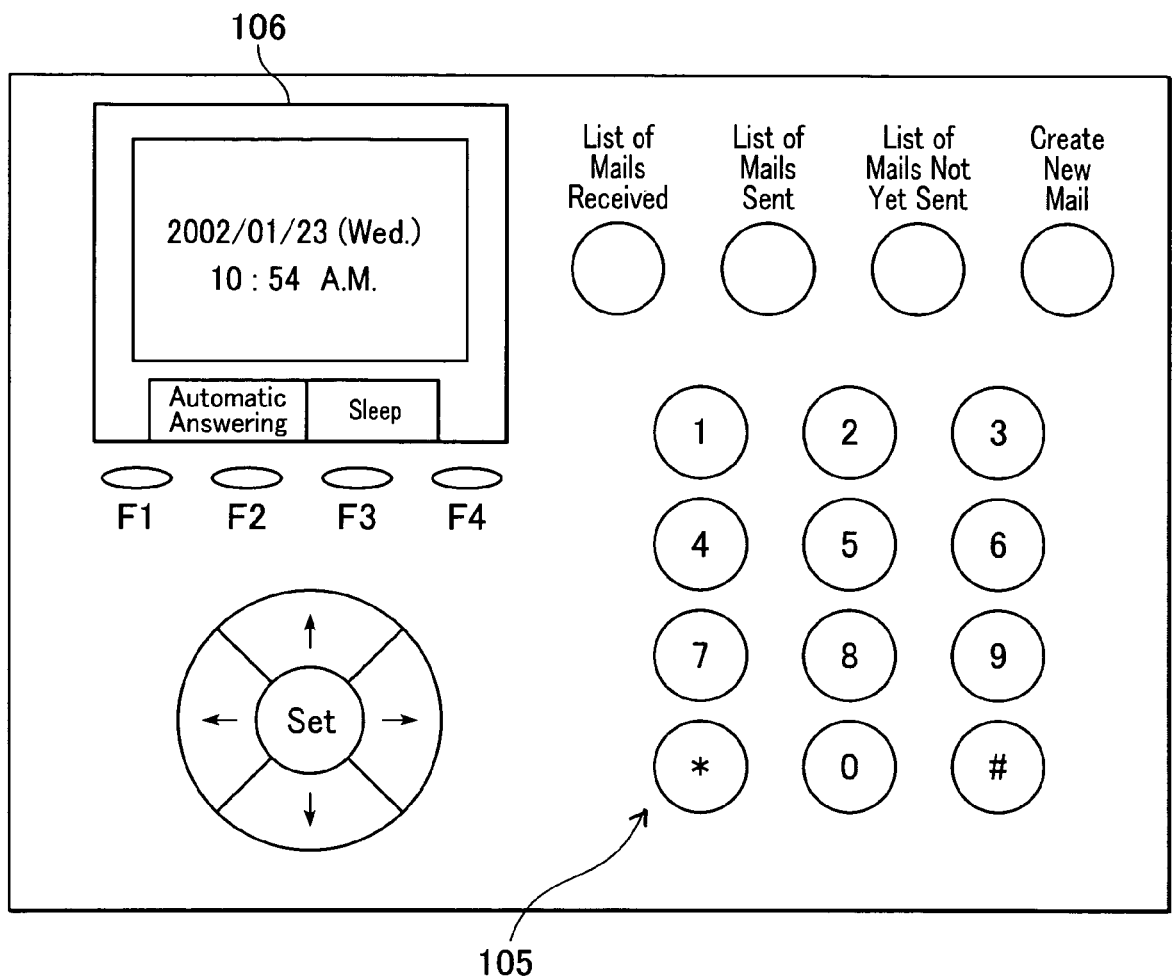
FIG. 14 is an external view of an operating unit of the facsimile apparatus.

FIG. 14 is a perspective view of the facsimile apparatus 100 showing the user interface. The user interface includes the operating unit 105 and the display 106. The operating unit 105 includes numeric keys and function keys F1, F2, F3, and F4 for executing various functions in accordance with content displayed on the display 106. The operating unit 105 also includes a function key for sending and receiving email, a key for showing a list of received mail, a key for showing a list of mail that have been sent, a key for showing a list of mail yet to be sent, and a key for showing a list of new mail.

Figure 2:
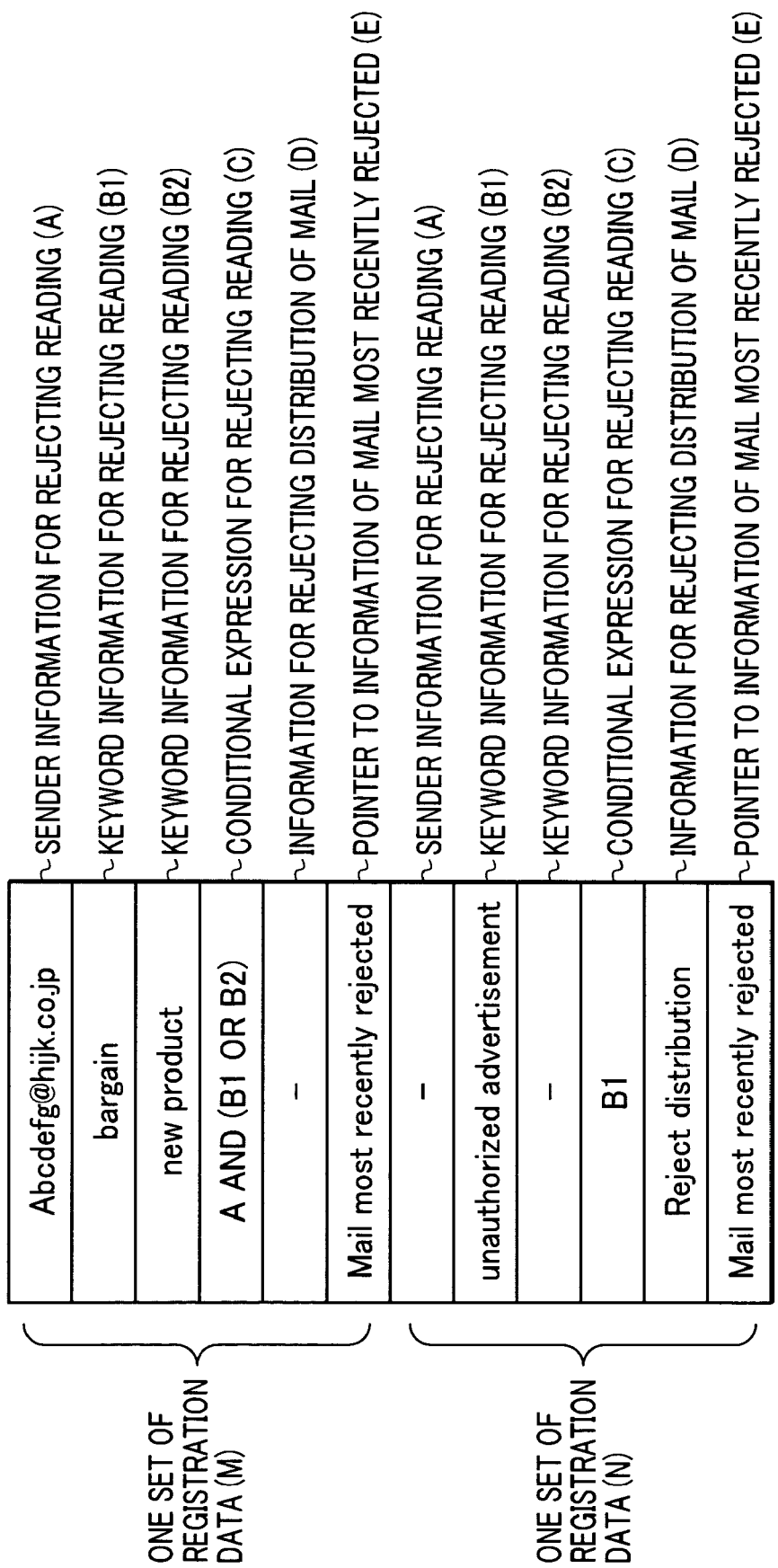
FIG. 2 shows an example structure of reading rejection setting data in the embodiment.

FIG. 2 shows an example of reading-rejection setting data. The reading-rejection setting data includes the following five fields:

A: Sender information such as a mail address
B: Information regarding keywords in the subject or the body
C: Condition for rejection
D: Distribution rejection information
E: Information regarding mail most recently received and rejected The sender information (A) is a field for registering a mail address of a sender to be rejected. When an email message is received, pattern matching is performed between the mail address of the sender and the information registered in this field, and reading of the email message is rejected if a match is found. The information registered may be a part of the mail address, such as "@hijk.co.jp." In this case, a text string before "@" is disregarded, and a match occurs if the mail address includes a text string of "@hijk.co.jp."

The keyword information (B) is a field for registering keywords that appear in the subject or the body of an email message. When an email message is received, the subject and the body of the email message are searched for strings corresponding to the registered keywords. If a text string matching one of the keywords is found in the subject or the body, reading of the email message is rejected. A plurality of keywords may be registered in a single set of rejection setting data.

The rejection condition (C) is used to determine conditions to reject email based on any combinations of the sender information (A) and the keyword information (B). For example, if rejection is set based only on the sender's information, "(C)=(A)" is registered. If rejection is set based on either the sender's information or the keyword information, then "(C)=(A) OR (B)" is registered. If rejection is set based on both the sender's information and the keyword information, then "(C)=(A) AND (B)" is registered. If rejection is set based on a combination of a plurality of keywords, then "(C)=(A) AND ((B1) OR (B2))" is registered.

Regarding the keyword information as a condition for rejection, distinction is made as to whether only the subject or both the subject and the body is to be searched for keywords.

The distribution rejection information (D) represents whether the mail distribution server 300 rejects distribution of mail from the sender if the sender information is independent in the rejection condition (C). If the user specifies that distribution of mail from the sender should be rejected, a result from communicating with the mail distribution server 300 is held in this field.

The recently received rejected mail information (E) is a pointer indicating a storage area where the most recent mail rejected on the basis of the condition after registering rejection information is stored.

As described above, the facsimile apparatus 100 manages a plurality of sets of reading-rejection setting data consisting of the five fields. When an email message is received, the facsimile apparatus 100 determines whether or not to read the email message based on the reading-rejection information it manages and the received email information.

Figure 3:
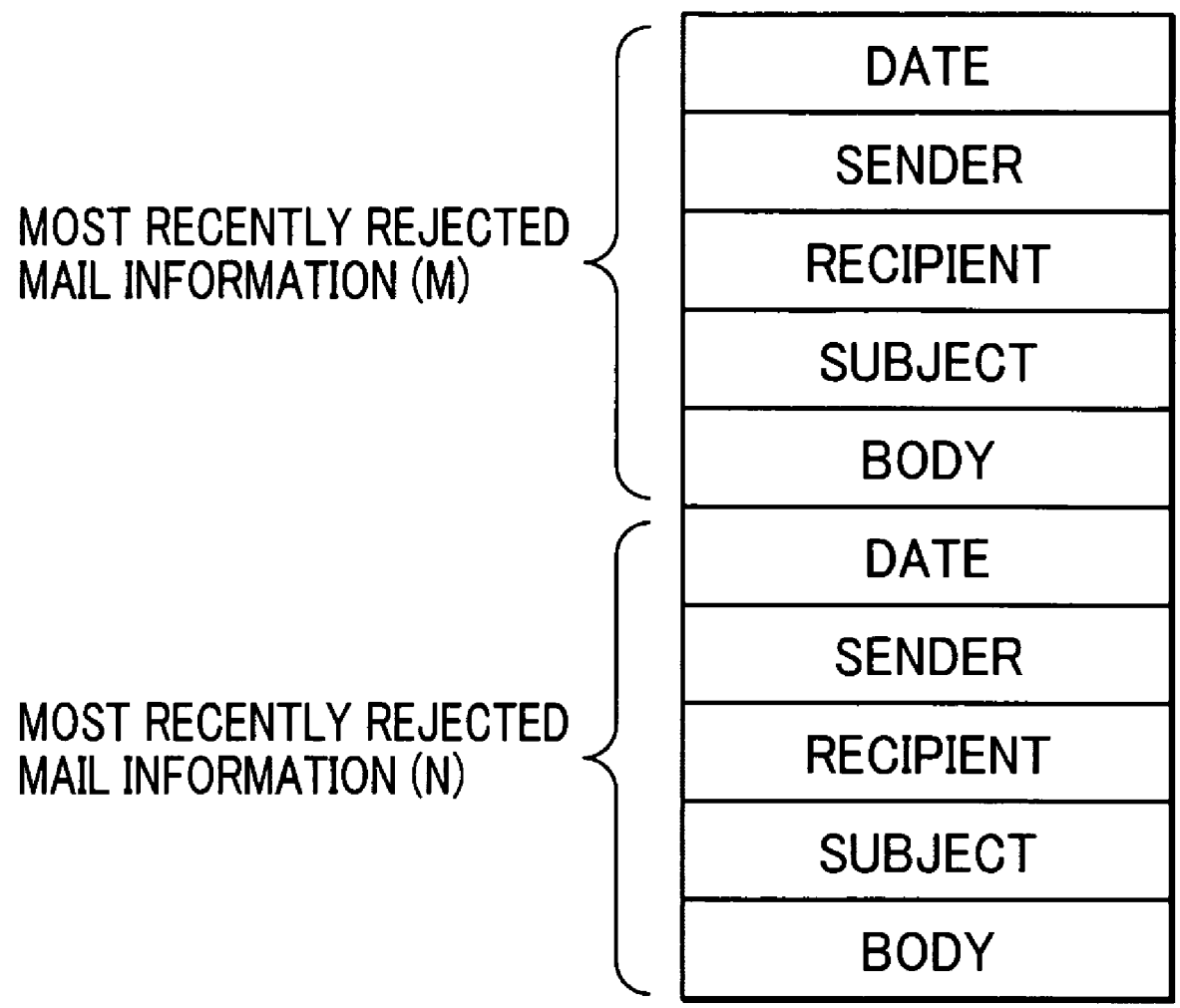
FIG. 3 shows an example structure of most recent mail information that has matched a reading rejecting condition and has therefore been rejected.

FIG. 3 is a diagram showing most recently rejected mail information.

The most recently rejected mail information includes the following five fields:
(1) Receipt date of the mail
(2) Mail address of the sender
(3) Mail address of the recipient
(4) Subject (Title)
(5) Body When an email message that is rejected based on the reading rejection conditions has been newly received, the information on the rejected email message is held, and the recently received rejected mail information field (E) shown in FIG. 2 is updated.

Now, operation of the facsimile apparatus 100 will be described in detail with reference to flowcharts shown in FIGS. 7, 8, 9, 10, 11, 12, and 13.

Figure 7:
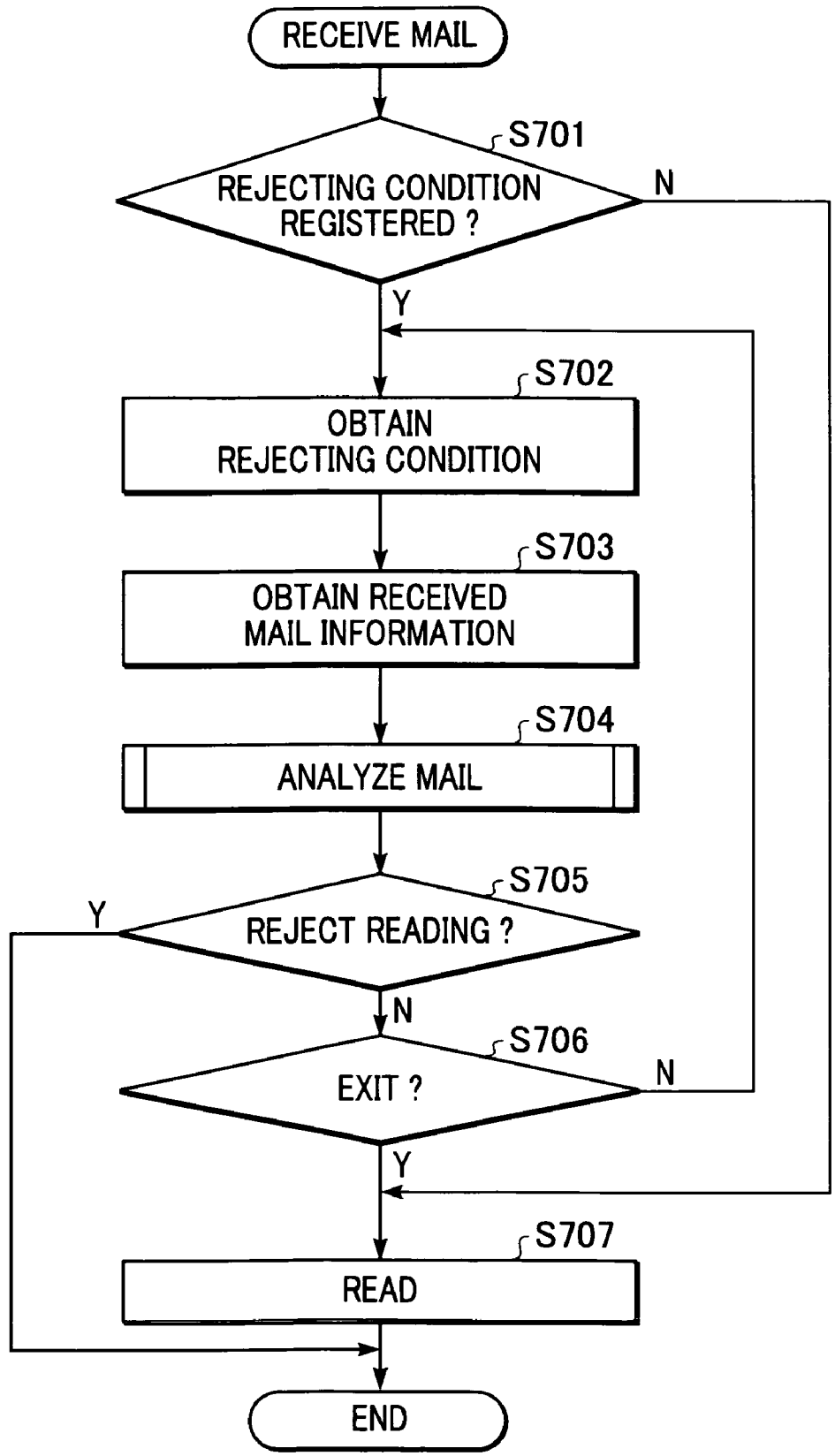
FIG. 7 is a flowchart of a mail receiving operation in the embodiment.
Figure 8:
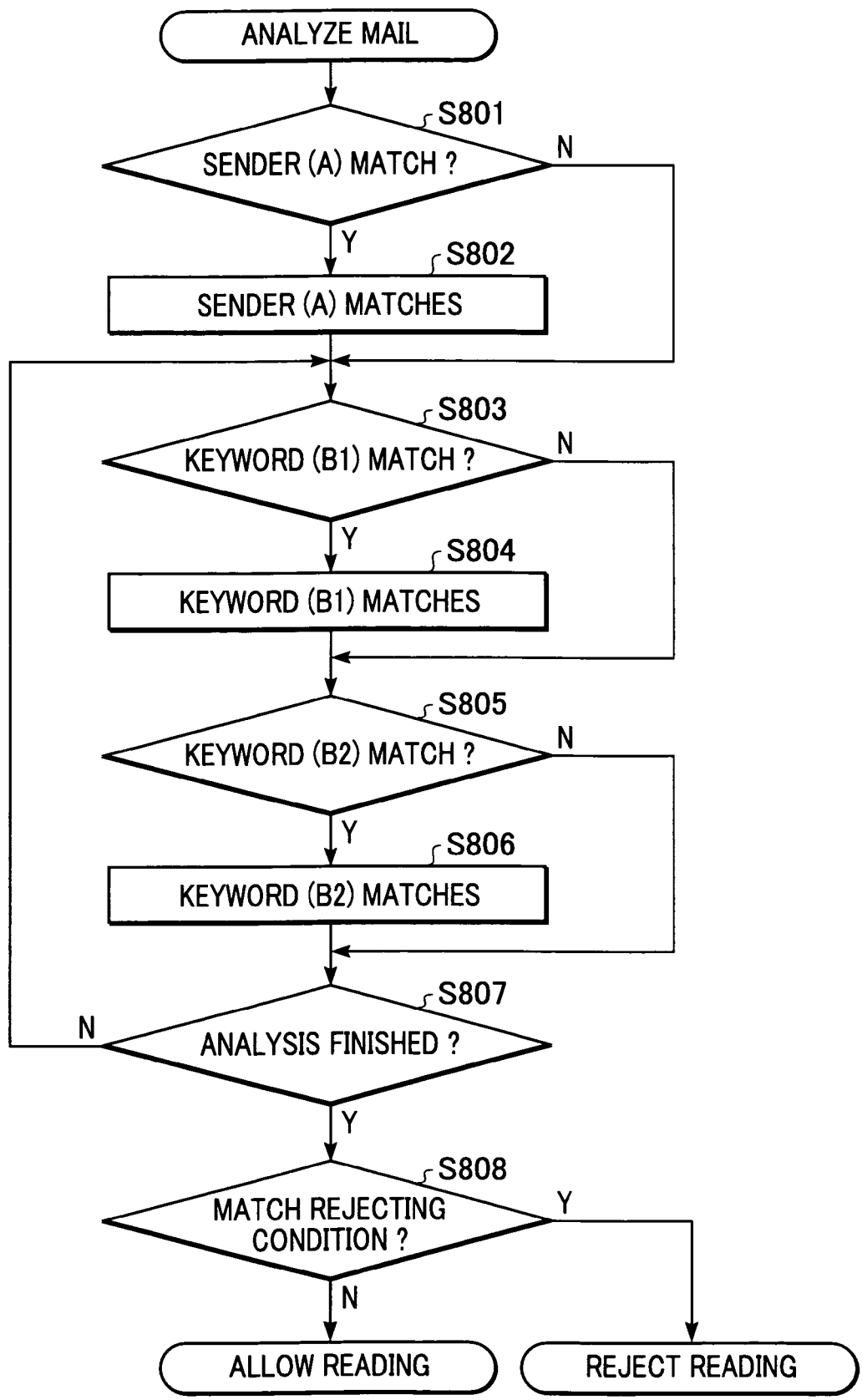
FIG. 8 is a flowchart showing a mail analyzing operation in the embodiment.

FIG. 7 is a flowchart of a mail receiving operation in accordance with one embodiment of the present invention. When a piece of mail distributed by the mail distribution server 300 is received, the mail is stored in a memory, and management information is updated. In step S701, it is checked whether setting for reading rejection condition, as shown in FIG. 2, has been registered. If NO, the mail is read in step S707. If the reading rejection condition is registered, the reading rejecting condition is obtained in step S702. The received mail information is obtained in step S703. In step S704, the received mail is analyzed. The received mail information, such as the sender information, subject, and body, is compared to the reading rejection information shown in FIG. 2. FIG. 8 is a flowchart showing a mail analyzing operation in accordance with one embodiment of the present invention. First, it is determined whether the sender information (A) in FIG. 2 has been registered. If the sender information has not been registered, the operation proceeds to step 802. If the sender information has been registered, the sender information (mail address) of the mail is compared to the registered sender information in step S801. If a match is found, in step S802, it is determined that the sender information matches.

As described earlier with reference to FIG. 2, the sender information may be registered in the form of a partial text string.

In steps S803 and S805, it is determined whether keyword information has been registered, and the subject and/or the body of the mail is searched for the registered keywords. If a text string matching one of the keywords is found in the subject or the body of the mail, matching with the keyword (B1) is determined in step S804 or matching with the keyword (B2) is determined in step S806. In step S807, it is determined whether the above searching operation has been performed for the entire mail. When searching is finished, in step S808, it is determined whether the mail is to be read or not based on the search results. If it is determined that reading of the mail is to be rejected, in step S705, the mail receiving process is exited. If it is determined that the mail is to be read, in step S706, it is determined whether another rejecting condition has been registered in the apparatus. If another rejection condition has been registered, the procedure described above is repeated with respect to that condition. After the mail is analyzed for all the rejecting conditions and the mail matches none of the rejecting conditions, in step S707 the mail is read.

Next, an operation for automatically reading a received mail and an operation for requesting reading of a mail retrieved from the apparatus 100 will be described.

In order to retrieve a mail message for reading, a user presses a received-mail list key shown in FIG. 14 to display a list of received mail messages (as shown in FIG. 15A). The user can search for and select a desired received mail from the list via up and down scrolling keys. Details of the mail message are displayed using a select key. FIG. 15B shows an example detail of a selected mail message from the list shown in FIG. 15A. The selected mail message is read via a read key. The mail messages on the list of received mail include mail messages received in the past as well as newly received messages, including messages that have been outputted by speech and messages in which speech output have been stopped.

Figure 4:
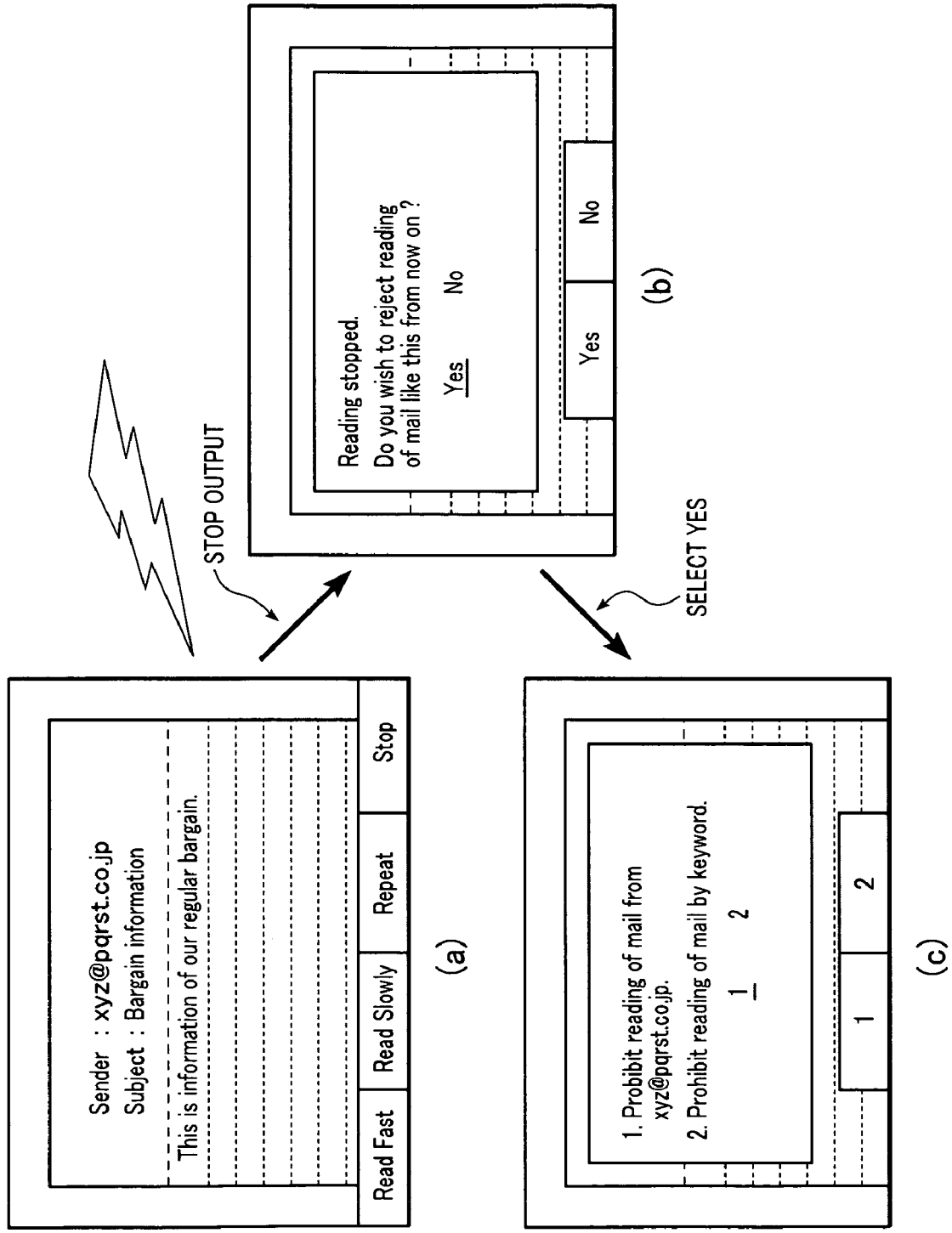
FIG. 4 shows an example screen for stopping reading.

When the user has selected a mail message and requested reading of the mail by the operation described above, or when a mail message that is to be read has been newly received and the mail is to be automatically read, a speech synthesizing unit 108 for analyzing text and for outputting audio data is initialized (step S901). Then, in step S902, mail information is analyzed and converted to create synthetic speech data. Then, in step S904 and S905, the synthetic speech data obtained by the conversion is sequentially outputted while allowing the user to monitor output status. In step S906, steps S902-S905 are repeated until the mail is completely read. During reading operation, in step S903, it is determined whether a stop request from the user has been received. If there is a stop request, the process proceeds to step S909 where it is determined whether the selected mail message matches a reading rejecting condition. If the mail matches a reading rejection condition and if reading is requested by the user, the reading operation is immediately exited. If the mail does not match any of the mail rejection conditions, in step S910, the user must confirm whether to set a mail rejection condition relating to the mail. FIG. 4 shows an example display on the display screen 106 for stopping reading.

Figure 11:
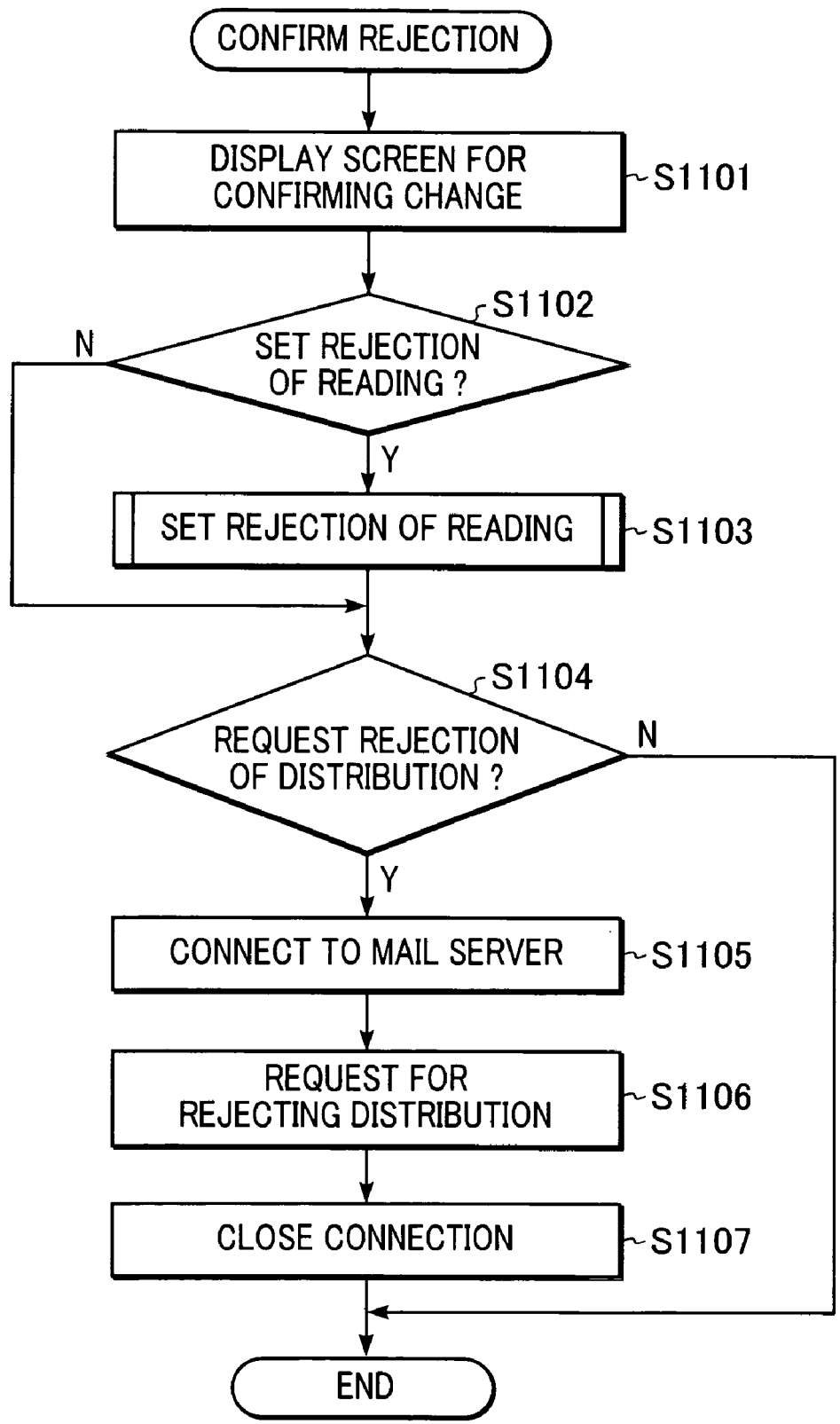
FIG. 11 is a flowchart showing a reading-rejection confirming operation in the embodiment.
Figure 12:
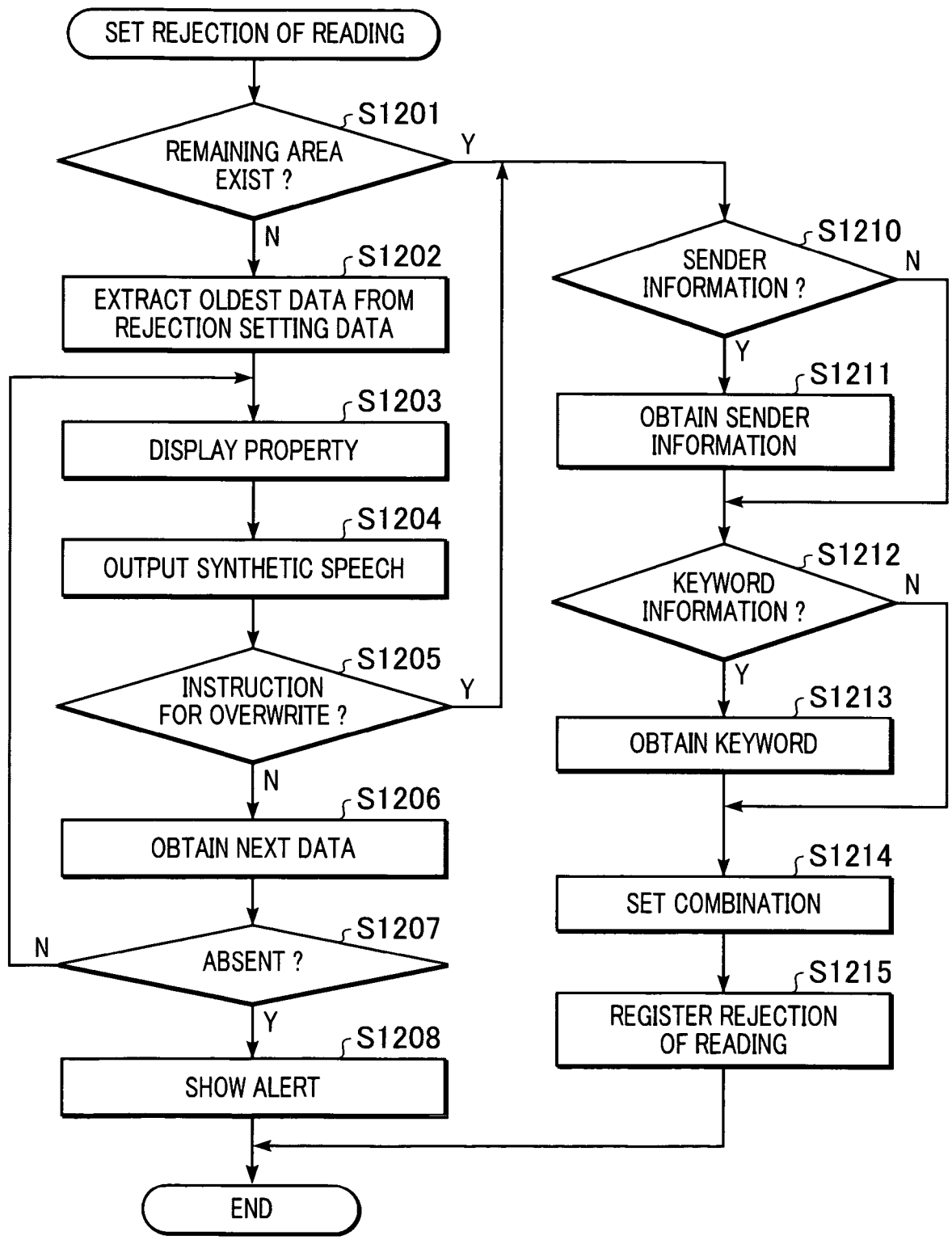
FIG. 12 is a flowchart showing a reading-rejection setting operation in the embodiment.

FIG. 11 is a flowchart showing an operation to confirm setting of reading-rejection in one embodiment of the present invention. First, in step S1101, a message prompting a user to confirm setting of reading rejection of the mail is displayed on the display 106. As shown in FIG. 4, the display shows a message saying "Reading stopped. Do you wish to reject reading of mail like this from now on? Yes No." In step S1102, if the user does not select rejection of reading, the procedure proceeds to a process for rejecting distribution of mail. If the user selects rejection of reading, in step S1103, a process for rejecting reading of mail is executed. FIG. 12 is a flowchart showing a reading-rejection setting operation in one embodiment of the present invention. In step S1201, it is determined whether a remaining area for registration exists. If a remaining area for registration exists, rejection information is registered according to user's instructions. First, the user is prompted to choose a basis for rejecting reading. For example, it is determined in steps S1210 and S1211 whether a sender's mail address is to be used. In steps S1212 and S1213, it is determined whether keywords that appear in the subject or the body are to be used. Furthermore, if a plurality of determining criteria is selected, in steps S1214 and S1215, it is determined how the criteria are to be combined. In the example shown in FIG. 2, the sender mail address (abcdefg@hijk.co.jp) and two keywords ("bargain" and "new product") are registered, and reading is rejected if a received mail includes the sender mail address and at least one of the two keywords. In this example, since the sender's mail address is independent in the reading rejecting conditions, in step S1215, a message saying "Do you wish to reject distribution of mails from abcdefg@hijk.co.jp from now on?" is displayed to prompt the user to choose whether distribution of mail is to be rejected. If a remaining area for registration does not exist, in step S1202, the reading rejection setting data shown in FIG. 2 is searched to extract an oldest mail whose reading has been rejected. In step S1203, property information such as sender information is displayed from management information of the mail. In step S1204, the mail is read by synthetic speech. In step S1205, the user is prompted to confirm whether the information may be overwritten. If the user permits overwriting of the information, the process proceeds to step S1210. If the user does not permit overwriting of the information, in steps S1206 and S1207, the searching process continues for mail whose reading has been rejected until no further rejection information exists. If an area that can be overwritten is not found after the searching process, in step S1208, an alert reading "An area for new registration is not available" is displayed on the display 106, and the reading rejection setting procedure is exited.

Returning to FIG. 11, if the user does not set a rejection condition, in step S1104, the rejection confirming procedure is immediately exited, and the mail reading procedure is also exited. If the user has set a rejection condition, the condition is checked. If the sender information is independent in the reading rejection conditions and if the user has rejected distribution of mail, in step S1105, the apparatus 100 connects to the mail distribution server 300. In step S1106, the apparatus 100 requests rejection of distribution of mail of the specified sender mail address. In step S1107, the result is registered in field (D) shown in FIG. 2, and the connection is closed. The mail reading procedure is then exited.

Figure 9:
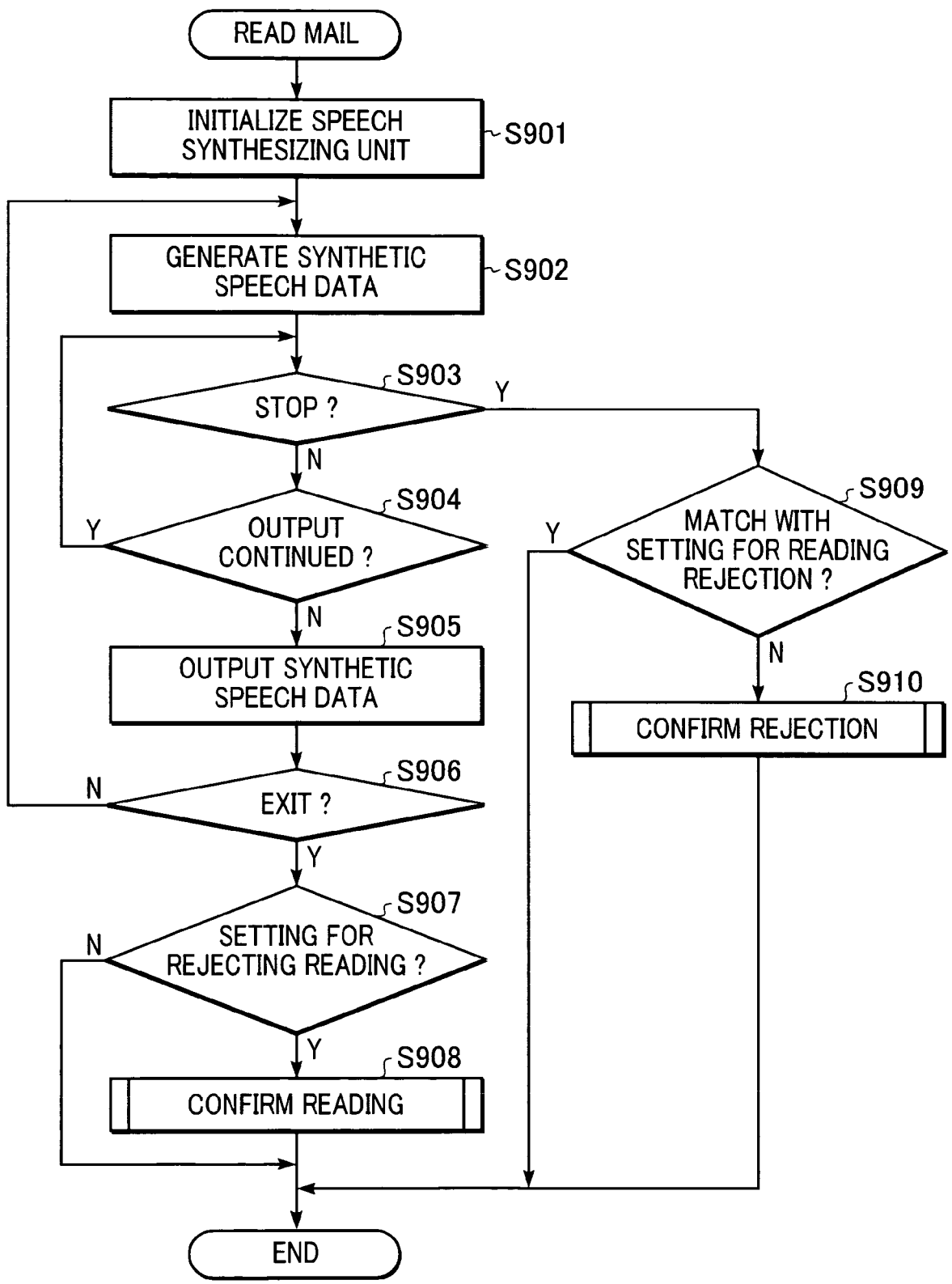
FIG. 9 is a flowchart showing a mail reading operation in the embodiment.

In the mail reading process of FIG. 9, if the synthetic-speech outputting process is completed without interruption, in step S907, it is determined whether the user has selected reading of the mail and whether the rejection of automatic reading has been set. If rejection of reading is not set, the mail reading procedure is exited. If rejection of reading is set, in step S908, the user is prompted to confirm that the setting for reading has changed.

Figure 5:
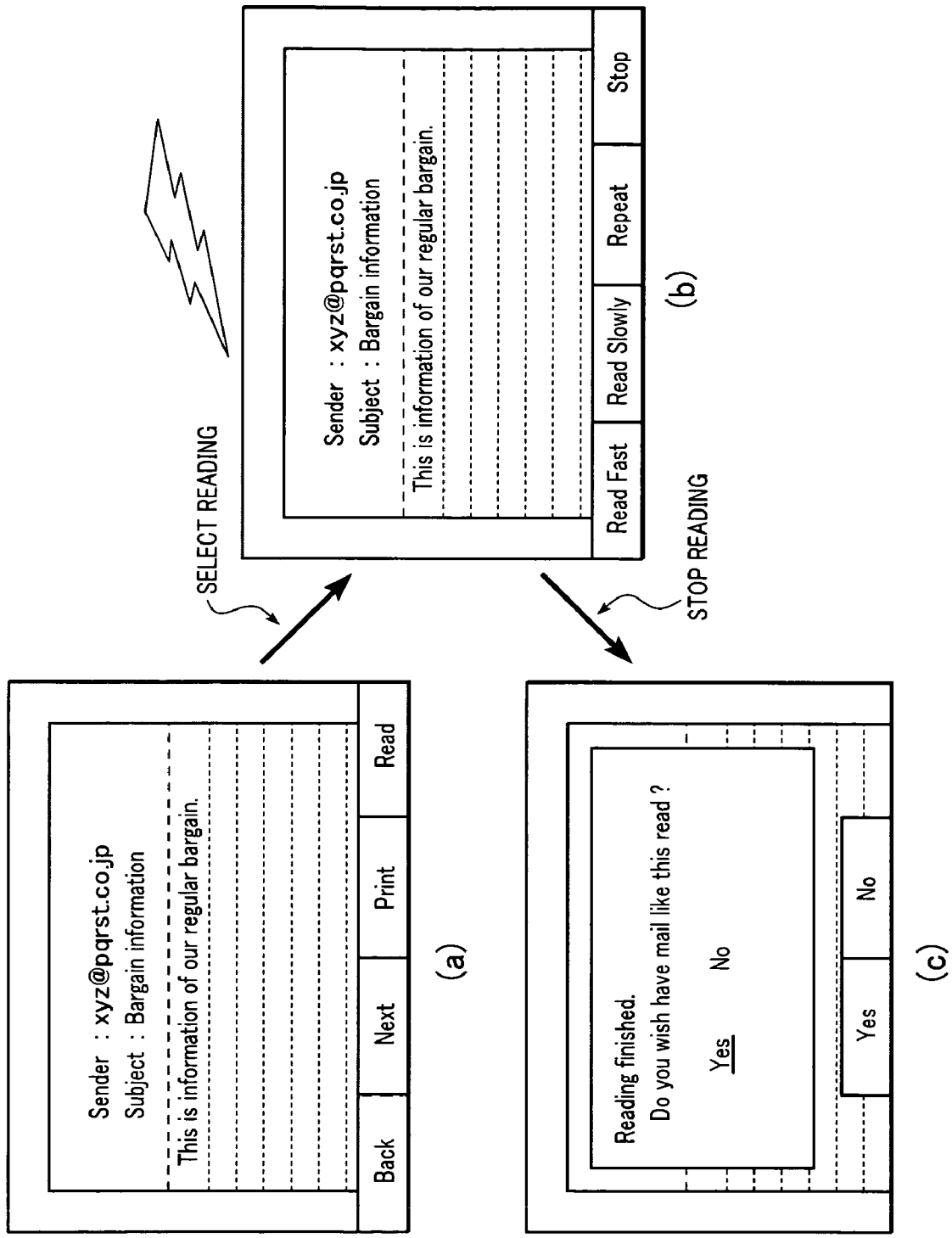
FIG. 5 shows an example screen that is displayed when a reading procedure has been finished.
Figure 10:
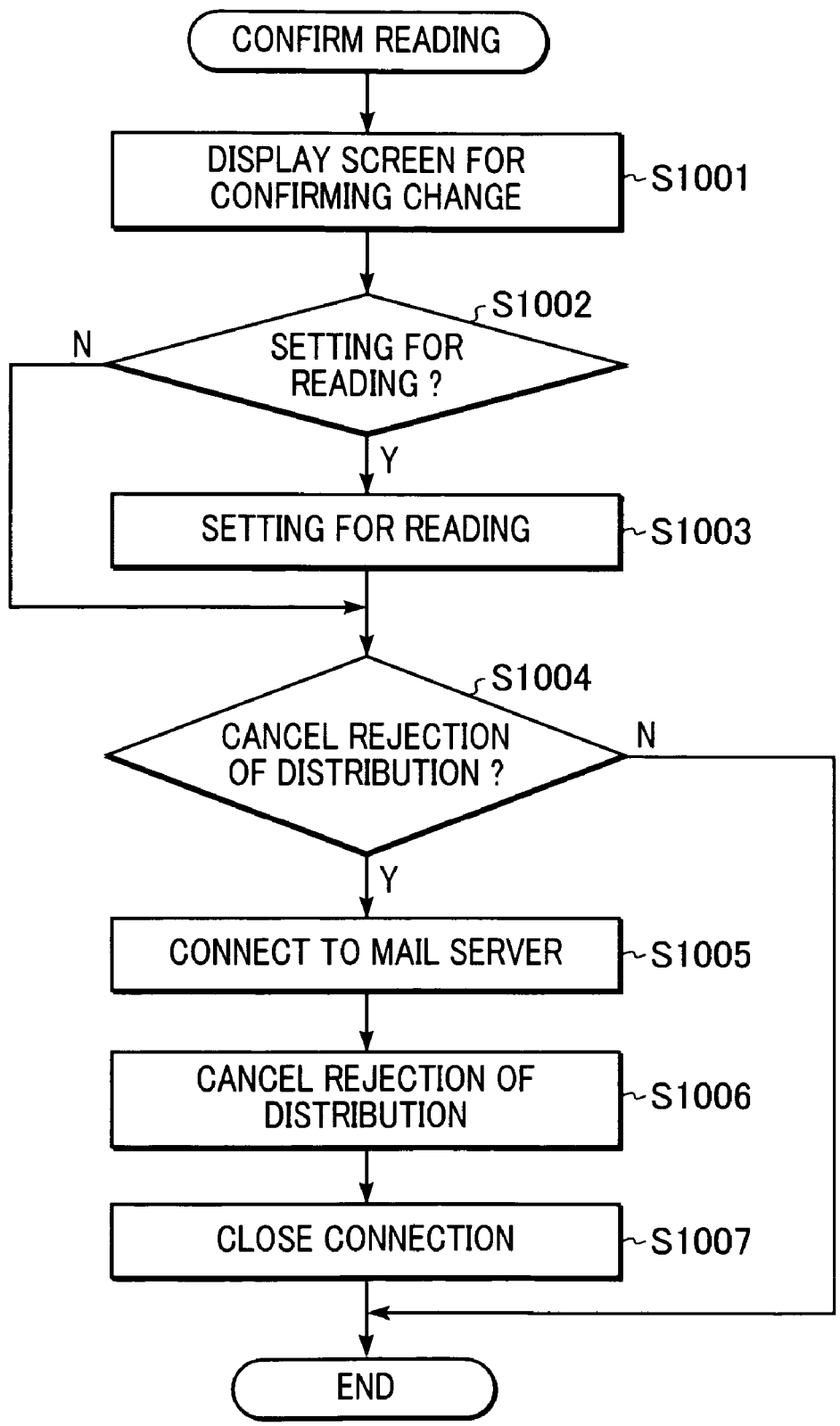
FIG. 10 is a flowchart showing a reading confirming operation in the embodiment.

This operation status is shown in FIG. 5, and will be described in combination with a flowchart shown in FIG. 10. FIG. 5 shows example screens that are displayed when a reading procedure is completed. FIG. 10 is a flowchart showing a reading confirmation operation in accordance with one embodiment of the present invention. In the procedure for confirming change in setting for reading, information that is currently registered is displayed (step 1001). In step S1002, the rejection of reading is cancelled, and the user is prompted to choose whether the mail is to be read subsequent to the canceling of the rejection condition. If the user does not choose to cancel rejection of reading and if distribution of mail is currently rejected, in step S1004, the user is then prompted to choose whether or not to cancel rejection of distribution of mail. If cancellation of rejection of mail distribution is not selected, the reading confirmation procedure is immediately exited. If cancellation of rejection of mail distribution is selected, in step S1005, the apparatus 100 connects to the mail distribution server 300. In step S1006, the apparatus 100 requests that the rejection of distribution of mail of the sender's mail address be canceled. In step S1007, the result is registered in field (D) shown in FIG. 2, and the connection is closed. The reading confirmation procedure is then exited, and the mail reading procedure is then exited. When the user has selected cancellation of rejection of mail distribution, in step S1003, the reading rejection setting data shown in FIG. 2 is updated so that mail will be read after the operation. Then, if mail distribution is currently rejected, in step S1004, the user is prompted to confirm whether rejection of mail distribution is to be cancelled. If cancellation of rejection of mail distribution is not selected, the reading confirmation procedure is immediately exited, and the mail reading procedure is then exited.

Figure 6A:
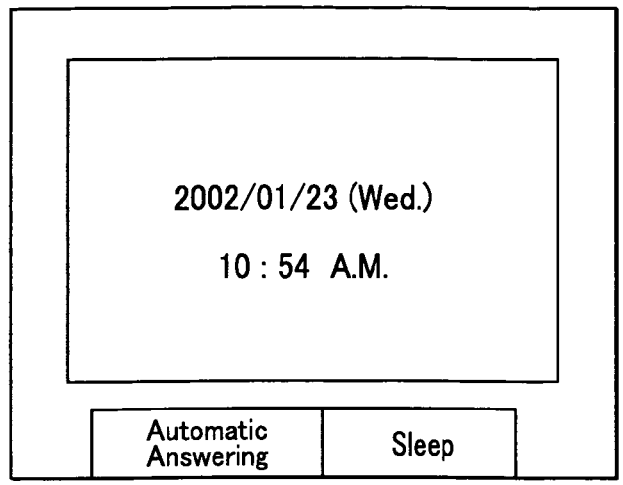
FIGS. 6A to 6C shows example screens that are displayed when the status of the facsimile apparatus is switched.
Figure 6B:
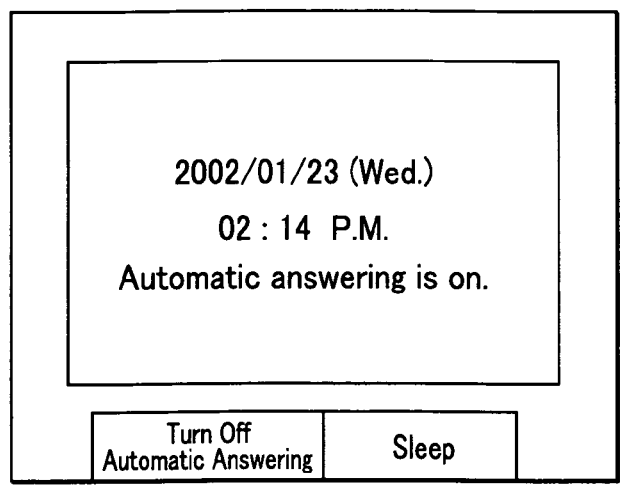
Figure 6C:
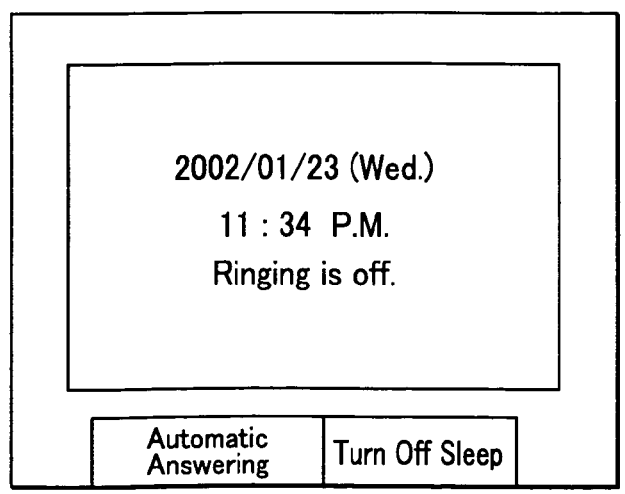
Figure 13:
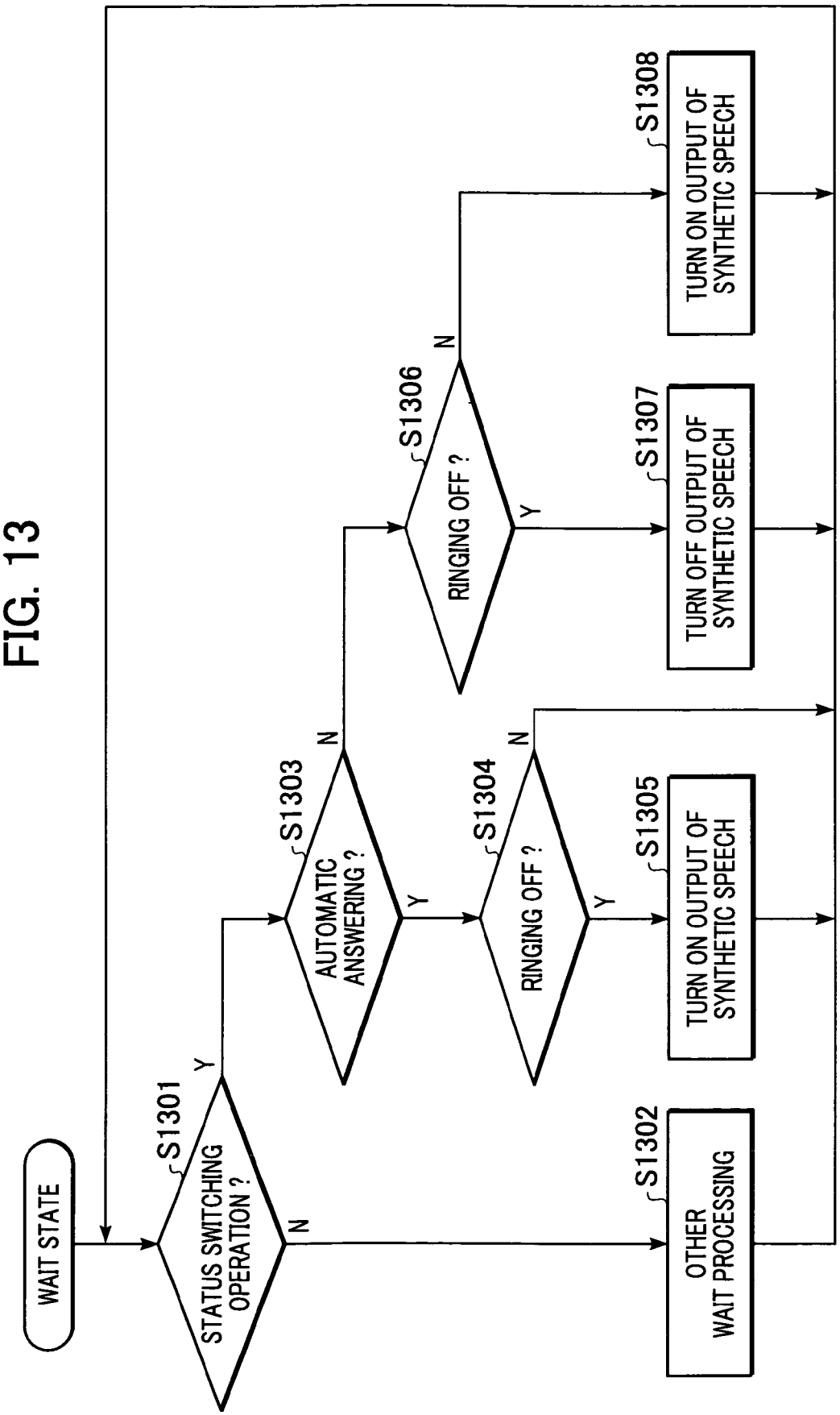
FIG. 13 is a flowchart showing a wait-state changing operation in the embodiment.

Next, an operation for switching mail reading procedure in accordance with switching of operation status of the apparatus 100 will be described with reference to FIGS. 6A-C and a flowchart shown in FIG. 13. FIG. 13 is a flowchart showing a wait-state changing operation in accordance with one embodiment of the present invention.

In step S1301, in a wait state, a status switching operation is detected while waiting for various events. If a switching request is not detected, general wait processing such as monitoring of incoming calls is executed in step S1302. When a switching operation is detected in the wait state, the status after the switching is checked. In step S1303, it is determined whether the status entered an automatic answering mode. If it is determined that the status has entered the automatic answering mode, it is determined in step S1304 whether ringing was off in the previous status. If ringing was off, the status enters a synthetic speech output mode in step S1305, allowing checking of received mail via voice similarly to an answering machine. If the status has not entered the automatic answering mode, in step S1306, it is determined whether the ringing-off mode that is used during sleep or the like is on. If the status was the ringing-off mode, in step S1307, the status enters a mode in which synthetic speech is not outputted so that output of voice is prohibited when mail is received, as in the case of the sleep mode. If the status after the switching is another status, in step S1308, the status enters a mode in which synthetic speech is outputted, as in the automatic answering mode so that content of received mail can be checked by voice.

If a mail message that does not match any condition for rejection of reading by synthetic speech is received, whether the message is to be read is determined together with the control of incoming normal phone calls according to operation status set by the user, such as "at home," "not at home," "sleep," or the like. Accordingly, the user is allowed to control output of synthetic speech similar to control of normal phone calls.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication apparatus for allowing a user to receive and read messages, including email messages, from a distribution server coupled thereto, the communication apparatus comprising:
   a registration unit registering data including setting data specifying a type of email message not to be read automatically by synthetic speech when it is received from the distribution server;
   a determining unit determining whether to read a received email message based on the setting data and the received email message when the email message is received from the distribution server;
   a synthetic-speech output unit converting the received email message into synthetic speech information and outputting the synthetic speech information when the determining unit determines to read the received email message;
   a display unit; and
   an operating unit accepting user inputs, including a user input to register setting data into the registration unit and a user input to stop output of the synthetic speech information,
   wherein, when the operating unit accepts the user input to stop output of the synthetic speech information, the display unit displays a confirmation message prompting the user to confirm whether to have the registration unit register setting data specifying email messages matching the received email message as a type of email message not to be read automatically.

2. A communication apparatus according to claim 1, wherein in response to the user input to stop output of the synthetic speech information, the display unit displays a confirmation message prompting the user to confirm rejection of email distributions matching the received email message.

3. A communication apparatus according to claim 2, further comprising a communication unit facilitating communication with the distribution server, wherein in response to the user input to reject distribution of emails, the communication unit communicates with the distribution server to request rejection of email distributions matching the received email message.

4. A communication apparatus according to claim 1, further comprising:
   a receiving unit storing email messages received from the distribution server; and
   a selecting unit allowing the user to select an email message stored in the receiving unit for reading by synthetic speech,
   wherein the synthetic-speech output unit converts the email message selected by the selecting unit into synthetic speech information and outputs the synthetic speech information, and
   wherein when the selected email message is the one that was not automatically read when the selected email message was received from the distribution server and when there was no user input to stop reading, the display unit displays a confirmation message prompting the user to confirm whether to have the registration unit register setting data specifying email messages matching the received email message as a type of email message to be read automatically.

5. A communication apparatus according to claim 4, wherein the display unit displays a confirmation message prompting the user to confirm cancellation of email distribution rejections that match the received email message.

6. A communication apparatus according to claim 5, further comprising a communication unit facilitating communication with the distribution server, wherein in response to a user input to cancel rejection of email distributions, the communication unit communicates with the distribution server to cancel rejection of email distributions matching the received email message.

7. A method of controlling a communication apparatus including a communication device for communicating with a distribution server, a registration device for registering data, an output device for outputting synthetic speech information, a display, and an input device allowing user inputs, the method comprising the following steps:
   registering via the registration device setting data including data specifying a type of email message not to be read automatically by synthetic speech when it is received from the distribution server;
   receiving email messages from the distribution server via the network device;
   determining whether to read a received email message based on the setting data and the received email message when the email message is received from the distribution server;
   when it is determined to read the received email message, converting the received email message into synthetic speech information and outputting the synthetic speech information via the output device; and
   responsive to receiving a user input via the input device to stop outputting the synthetic speech information, displaying a confirmation message prompting the user to confirm whether to register setting data so as to reject reading email.

8. A method of controlling a communication apparatus according to claim 7, wherein the step of determining whether to register setting data so as to reject reading email messages automatically further includes:
   confirming whether to reject distribution of email messages similar to the received email message if a user input via the input device to reject reading email messages similar to the received email message automatically is received.

9. A method of controlling a communication apparatus according to claim 8, wherein if a user input via the input device to reject distribution is received, requesting the distribution server to reject distribution of email messages similar to the received email message.

* * * * *